United States Patent
Doerr et al.

(10) Patent No.: US 7,515,808 B2
(45) Date of Patent: Apr. 7, 2009

(54) THERMALLY STABILIZED WAVEGUIDES

(75) Inventors: Christopher Richard Doerr, Middletown, NJ (US); Ashok Maliakal, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/757,098

(22) Filed: Jun. 1, 2007

(65) Prior Publication Data

US 2008/0298760 A1   Dec. 4, 2008

(51) Int. Cl.
*G02B 6/00* (2006.01)
*G02B 6/10* (2006.01)

(52) U.S. Cl. .................. 385/141; 385/129; 385/130; 385/131; 385/142; 385/144

(58) Field of Classification Search .............. 385/141
See application file for complete search history.

(56) References Cited

U.S. PATENT DOCUMENTS

| 6,441,077 B1 * | 8/2002 | Border et al. | 524/433 |
| 6,642,295 B2 * | 11/2003 | Border et al. | 524/437 |
| 6,775,449 B2 * | 8/2004 | White | 385/123 |
| 7,065,285 B2 | 6/2006 | Chen et al. | |
| 7,081,295 B2 * | 7/2006 | James et al. | 428/327 |
| 7,091,271 B2 * | 8/2006 | James et al. | 524/430 |
| 2003/0136946 A1 * | 7/2003 | Kumacheva | 252/500 |
| 2003/0174994 A1 * | 9/2003 | Garito et al. | 385/129 |
| 2004/0105980 A1 * | 6/2004 | Sudarshan et al. | 428/404 |
| 2005/0042453 A1 * | 2/2005 | James et al. | 428/403 |
| 2005/0082521 A1 * | 4/2005 | Torimoto et al. | 257/17 |
| 2007/0298256 A1 * | 12/2007 | Fukui et al. | 428/402.24 |

OTHER PUBLICATIONS

Y. Inoue et al. "Athermal Silica-Based Arrayed-Waveguide Grating Multiplexer" Electronics Letters, vol. 33, No. 23, Nov. 6, 1997, pp. 1945-1947.

* cited by examiner

*Primary Examiner*—Frank G Font
*Assistant Examiner*—Ryan Lepisto

(57) ABSTRACT

An apparatus comprising a planar optical waveguide having an optical core and optical cladding next to the optical core. The optical core or cladding includes a plurality of particles therein. Each particle has a nucleus and polymeric molecules permanently bonded to the nucleus to form a shell. A plurality of nuclei are dispersed in said core or cladding.

11 Claims, 7 Drawing Sheets

THERMALLY STABILIZED WAVEGUIDES

TECHNICAL FIELD OF THE INVENTION

The present invention is directed, in general, to planar optical waveguides.

BACKGROUND OF THE INVENTION

Planar optical waveguides enjoy widespread use in optical communications technology, including switches, filters and multiplexers. Stability of the index of refraction, $n_i$, of the waveguide material is desirable to maintain device operation within a desired tolerance. However, the $n_i$ of such materials commonly varies as a function of temperature. Such variability is commonly defined by a nonzero value of the thermo-optic coefficient (TOC), or $\partial n/\partial T$.

In many cases, required performance stability of an optical system necessitates controlling the temperature of a waveguide to maintain the $n_i$ of the waveguide within design tolerances. Such temperature control imposes costs and complexity on system design and manufacture.

SUMMARY OF THE INVENTION

To address the above-discussed deficiencies of the prior art, various embodiments provide an apparatus having planar optical waveguides (POWs) that may have reduced thermo-optic coefficients.

One embodiment is an apparatus that includes a POW having an optical core and optical cladding next to the optical core. The optical core or cladding includes a plurality of particles therein. Each particle has a nucleus and polymeric molecules permanently bonded thereto to form a polymer shell. A plurality of nuclei are dispersed in the core or cladding.

Another embodiment is a method of fabricating a planar optical waveguide. The method includes chemically bonding a polymer to a surface of a nucleus to form a particle having a polymer shell. A layer of the particles is formed on a substrate, where the layer includes a plurality of nuclei dispersed in the polymer. Portions of the layer are selectively removed to form a planar optical waveguide.

BRIEF DESCRIPTION OF THE DRAWINGS

For a more complete understanding of the invention, reference is now made to the following descriptions taken in FIG. 1 illustrates a planar optical waveguide (POW).

DETAILED DESCRIPTION

Figure 1:
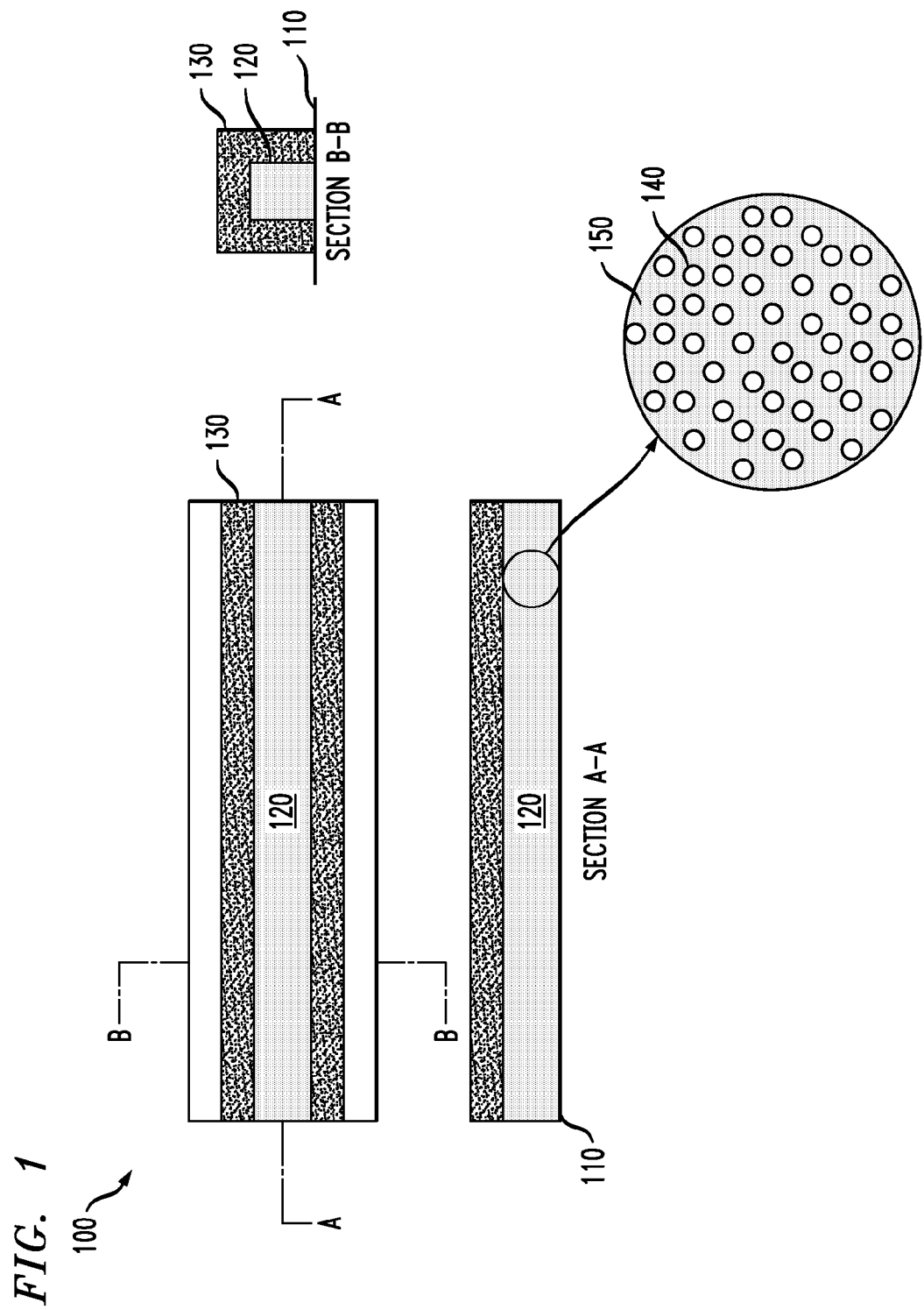

FIG. 1 illustrates one embodiment of a planar optical waveguide (POW) 100. The POW 100 includes a substrate 110 with an optical core 120 thereon. The core 120 is substantially transparent to a wavelength of light to be used in operation of the POW 100. The substrate 110 may be any substrate with suitable optical properties, e.g., having a refractive index $(n_i)$ that is equal to or lower than the refractive index of the core 120.

The POW 100 also may include an optical cladding 130. In one aspect, the optical cladding also has a refractive index less than that of the core 120. In some cases the cladding 130 may be omitted, as the refractive index of air will be less than the refractive index of the core 120.

At least one of the core 120 and the cladding 130 includes nuclei 140 substantially uniformly dispersed therein. In an embodiment, the nuclei 140 include a material that is transparent to a wavelength of light confined by the POW 100. The core 120 or cladding 130 also includes a medium 150 that includes a polymer. In one aspect, the nuclei 140 are chemically bonded to the polymer. In another aspect, a nucleus 140 has a surface that is capable of forming a chemical bond with a functional group of a polymer, a "primer" compound or a polymerization initiator. These aspects are discussed further below. Materials suitable for use as the nuclei 140 include, but are not limited to, silica, doped silica, fluorozirconate, fluoroaluminate, and chalcogenide glasses, and polymers such as poly(dimethyl siloxane) (PDMS) and derivatives thereof. Functional groups that may be used to attach a primer compound or a polymerization initiator to the nuclei 140 include chlorosilanes ($-SiR_nCl_{3-n}$, where n=0-2), alkoxysilanes ($-SiR_nOR_{3-n}$, where n=0-2), carboxylates ($-COOH$), and phosphonates ($-PO_3R_2$).

The polymer included in the medium 150 has suitable properties for use in optical waveguides. Suitable characteristics include optical transparency at the operating wavelength of the light, dimensional stability and low optical loss at telecommunications wavelengths. Non-limiting examples of such polymers include poly(dimethyl siloxane) (PDMS), poly(acrylate), poly(carbonate), poly(styrene), and derivatives thereof.

Figure 2A:
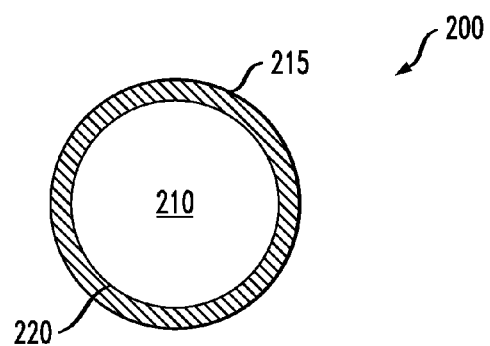
FIGS. 2A through 2C illustrate a nucleus with a polymer shell.

FIG. 2A illustrates a conceptual view of a particle 200 that includes a nucleus 210 and a polymer shell 215. In some embodiments, bonded polymers are believed by the inventors to form a substantially continuous coating on a surface 220 of the nucleus 210. When a layer including a plurality of particles 200 is formed, the polymers are believed to intermix to form the medium 150 in which the nuclei 140 are substantially homogeneously distributed. When the polymers are sufficiently long and flexible, they may additionally entangle. For example, in some cases, polymers may entangle when they include over about 200 monomer repeat units. As described below, the layer may then be formed into the POW 100.

The polymer may have a functional group capable of directly bonding to the surface 220 of the nucleus 210. In such cases, the functional group may be at a terminal or non-terminal position on the polymer chain. The composition of such a functional group may depend on the chemical composition of the nucleus 210. When the nucleus 210 comprises silica, e.g., the functional group may include silicon, and may further include an alkoxysilane moiety.

A primer or initiator compound may also have a functional group capable of bonding to the surface 220 of the nucleus 210. Again, for the example in which the nucleus 210 comprises silica, this functional group may include silicon, and may further include an alkoxysilane moiety. In some cases, the primer or initiator may include a derivative of a mono-trichlorosilane or a mono-trialkoxysilane. The primer additionally has a functional group capable of bonding to a reactive site on a polymer in the medium 150. The reactive site may be at a terminal or non-terminal position on the polymer chain.

The initiator has a functional group capable of initiating polymerization of a monomer. In some cases, the initiator includes a moiety capable of initiating anionic polymerization. Such a moiety may include, e.g., a lithium atom complexed with an organic anion. In other cases, the initiator includes a moiety capable of initiating atomic transfer radical polymerization (ATRP). Such a moiety may include, e.g., an alpha-bromo-substituted carbonyl such as the alpha-bromo-isobutyryl group.

The nucleus 210 and the shell 215 have a bulk thermo-optic coefficient (TOC), $\partial n/\partial T$. A bulk TOC is the TOC exhibited by a sample of a material large enough that the presence of the surface has a negligible effect on the TOC of the sample. The TOC may be approximately constant within a range of temperatures. Furthermore, the TOC may be greater than zero, indicating an increase of the index of refraction with increasing temperature, or less than zero, indicating a decrease of the index of refraction with increasing temperature. When the term thermo-optic coefficient or TOC is used herein, unless otherwise stated it is understood to refer to the thermo-optic coefficient at room temperature, about 25° C.

Advantageously, a nucleus 210 having a TOC of one sign may be combined with a shell 215 having the opposite sign to form a core 120 or cladding 130 having a desired TOC. For example, silica typically has a TOC of about +1 E-5° C.$^{-1}$, while PDMS may have a TOC ranging from about −1.5 E-4° C.$^{-1}$ to about −5 E-4° C.$^{-1}$. In one aspect, the TOC of the nucleus 210 and the shell 215 may be chosen to result in a desired TOC of the POW 100. In some embodiments, the desired TOC may be approximately zero. For example, as described below, the ratio of volume of the nucleus 210 and the shell 215 may be chosen to result in a TOC of the POW 100 of 1 E-6° C.$^{-1}$, 1 E-7° C.$^{-1}$, or less. Note that if the temperature range within which the TOC of the nucleus 210 and shell 215 are constant is limited, the temperature range within which the TOC retains its target value may be similarly limited.

The nucleus 210 is shown as spherical for illustration, but may be any geometry that does not result in significant scattering of light by the nucleus 210 at the optical wavelength of interest. The nucleus 210 may scatter an optical wave when the size of the nucleus 210 exceeds a minimum fraction of the wavelength λ of the wave. To reduce such scattering, it is preferred that no linear dimension of the nucleus 210 exceeds about ½λ. More preferably, no linear dimension of the nucleus 210 exceeds about ¼λ. Most preferably, no linear dimension of the nucleus 210 exceeds about ⅒λ. In one embodiment, if a POW 100 is used to propagate an optical signal in the C-band (about 1525-1565 nm), a preferred upper limit on a diameter of the nucleus 210 would be about 150 nm or less. Furthermore, as discussed below, there may be a preferred lower limit on size of the nucleus 210.

Figure 2B:
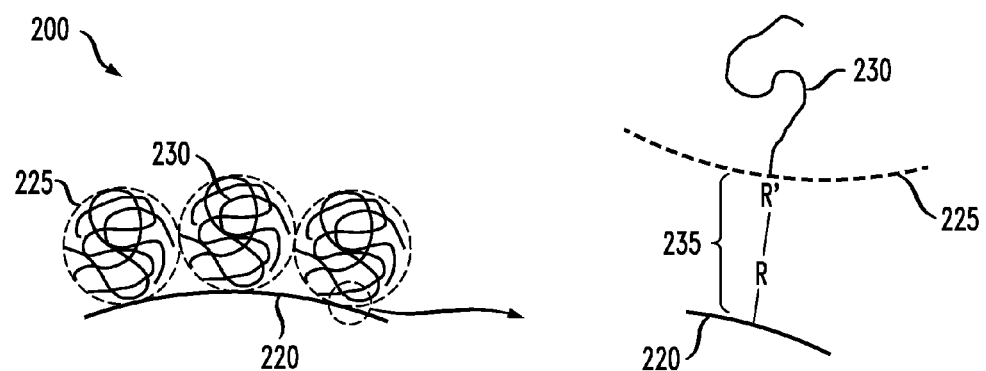

Turning to FIG. 2B, a detailed conceptual view of the particle 200 is illustrated. In the illustrated embodiment, the shell 215 is formed from polymer emulsion particles 225 bonded to the surface 220 of the nucleus 210. Each emulsion particle 225 includes one or more polymer chains 230. A primer 235 includes functional groups R and R'. The functional group R is bonded to the surface 220. The polymer chain 230 is bonded to the functional group R', thus attaching the emulsion particle 225 to the nucleus 210.

The emulsion particles 225 may be formed with a desired diameter determined by the conditions of formation. The shell 215 is expected to have about the same thickness as the diameter of the emulsion particles 225. For example, if the average diameter of the emulsion particles 225 is about 5 nm, the average thickness of the shell 215 may be about 5 nm.

Figure 2C:
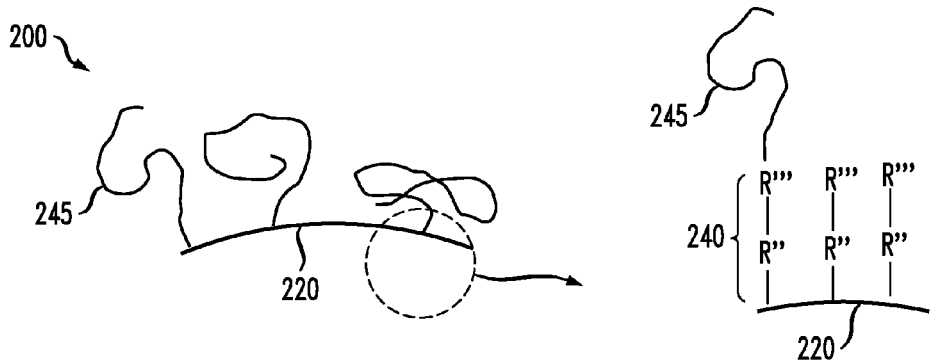

In a second embodiment, illustrated in FIG. 2C, the particle 200 includes a polymerization initiator 240 attached to the surface 220 via a functional group R". As described in greater detail below, the initiator 240 is first bonded to the surface 220. Then, a solution of monomers is provided to form the polymer chain 245 from an initiator group R'". The thickness of the resulting polymer shell 215 may be controlled by constraining the length of the polymer chains 245 formed on the surface 220. For example, the polymer chain 245 may be formed with a desired chain length by constraining the amount of monomer available. After reaching the desired length, the polymer chain 245 may then be terminated with a suitable end group. The thickness of the shell 215 is expected to be related to the length of the polymer chains formed on the surface 220. However, the thickness is expected to typically be less than the length of the polymer chains due to entropic effects and cohesion among neighboring polymer chains.

In a third embodiment (not shown), polymer emulsion particles are bonded directly to the nucleus 210. In this case, a functional group capable of bonding to the surface 220 is present on the polymer chain prior to bonding the polymer chain 230 to the surface 220. The functional group may contain silicon when the nucleus 210 comprises silica, and may further include an alkoxysilane moiety.

The TOC of the core 120 and the cladding 130 may be advantageously adjusted by controlling the volume fraction of the nuclei 140 and the medium 150 therein. In general, the TOC is expected to be approximately the sum of each TOC of the nuclei 140 and the medium 150, each weighted by its respective volume fraction. In some embodiments, the TOC value targeted is less than a maximum design value. This relationship may be expressed as $$VF_{Nuclei} * TOC_{Nuclei} + VF_{Medium} * TOC_{Medium} \leq \text{Maximum Design Value,}$$

where VF is the volume fraction of the nuclei or the medium.

In cases in which an application is relatively insensitive to the TOC of the waveguide, a relatively undemanding requirement may be imposed on the maximum design value. In some cases, this value may be greater than 1 E-6° C.$^{-1}$. In other cases, a more sensitive application may require a maximum design value less than about 1 E-6° C.$^{-1}$, while even more sensitive applications may require a maximum design value less than about 5 E-7° C.$^{-1}$. The required volume fraction of the nuclei and the medium may, in general, depend on the TOC of the nuclei and medium and the targeted maximum design value.

A non-limiting example is provided using the geometry illustrated in FIG. 2A. In this example, imperfect packing of the emulsion particles 225 is neglected. Thus, as illustrated in the embodiment of FIG. 2B, about 100% of the surface 220 may be covered by the emulsion particles 225. The thickness of the shell 215 may then be approximated by the thickness of the emulsion particles 225. The volume fraction of the shell 215 is then calculated using the diameter of the nucleus 210 and the thickness of the shell 215. The TOC of silica, about 1 E-5° C.$^{-1}$, and PDMS, about −1 E-4° C.$^{-1}$, are used as representative values of the TOC of the nucleus 210 and the shell 215, respectively.

For this case, a volume fraction of about 9% of the shell 215 in the core 120 or cladding 130 results in a TOC of about 1 E-7° C.$^{-}$. This volume fraction corresponds to a thickness of the shell 215 of about 2 nm when the diameter of the nucleus 210 is about 100 nm. In some cases, a larger nucleus 210 may provide better control of the volume fraction of the shell 215. In one embodiment, the diameter of the nucleus 210 is about 200 nm, and the thickness of the shell is about 3.2 nm. In another embodiment, the diameter of the nucleus 210 is about 400 nm, and the thickness of the shell is about 6 nm. In such embodiments, the diameter of the nucleus 210 may be chosen to be below a minimum diameter at which light is scattered in the POW 100.

Figure 3:
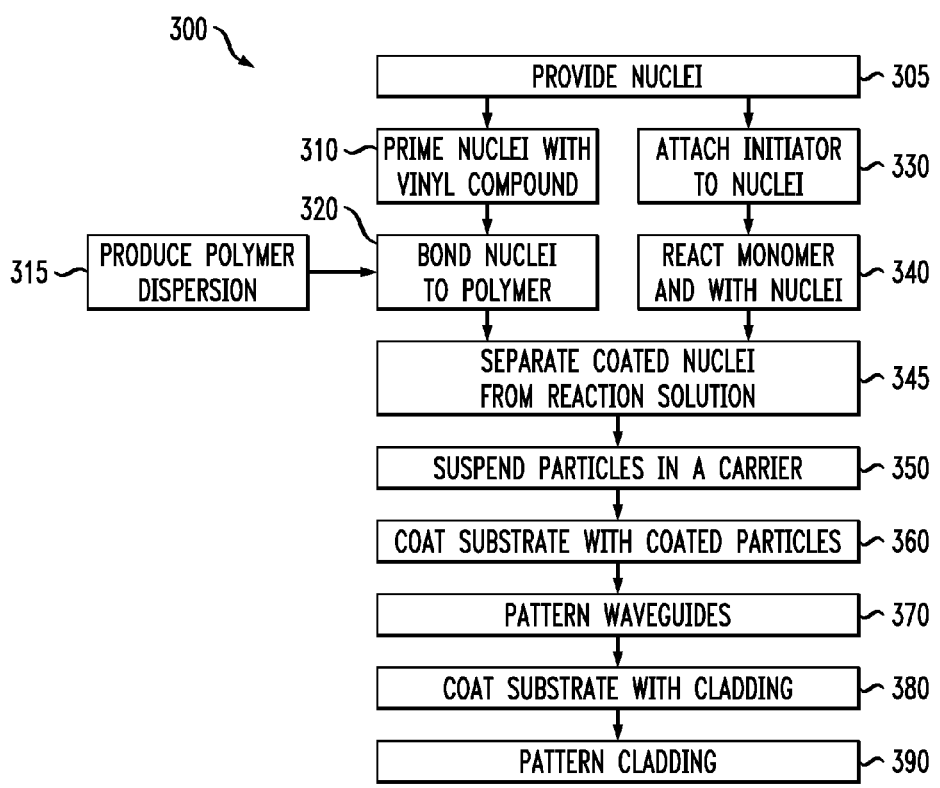
FIG. 3 illustrates embodiments of methods of producing a POW including nuclei with polymer shells dispersed therein.

Moving now to FIG. 3, illustrated are embodiments of a method 300 of fabricating a planar optical waveguide. The method includes chemically bonding a polymer to a surface of a nucleus to form a particle having a polymer shell. A layer of the particles is formed on a substrate, where the layer includes a plurality of nuclei dispersed in the polymer. Portions of the layer are selectively removed, e.g., via a conventional etching process, to form a planar optical waveguide.

In a step 305, nuclei for the particles are provided. In some cases, the nuclei are silica particles. In one aspect, silica particles with an average diameter ranging from about 100 nm to about 750 nm may be used. Methods of producing silica particles with diameters in this range are well known to those skilled in the pertinent art.

Steps 310-315-320 and 330-340 represent alternate embodiments of the method 300. In the embodiment represented by steps 310-315-320, a primer compound is bonded to the surfaces of the nuclei. The primer is a compound having a functional group capable of permanently bonding to the surface, and a functional group capable of permanently bonding with a polymer emulsion particle. A permanent bond is one that is stable over a temperature range normally experienced by the nucleus, including temperatures during the processing, storage and operation of a device including the nuclei. In some cases the permanent bond is a covalent bond.

In the step 310, a dispersion of nuclei coated with the primer is formed. As a non-limiting example, vinyl trimethoxysilane (TMS) may be used as the primer when the nucleus comprises silica. Vinyl trimethoxysilane may be bonded to the surface of silica particles by heating the silica particles in liquid vinyl TMS at about 100° C. for about 12 hours with agitation. Under these conditions, it is thought that the TMS moiety forms a silyl ether linkage with a hydroxyl group on a silica particle surface.

In a step 315, a dispersion is formed of polymer emulsion particles having a desired diameter. While recognizing that any of the polymers previously recited may be used, the case in which the polymer includes a derivative of PDMS is presented as a non-limiting example.

The figure below illustrates an example reaction forming PDMS by anhydrous anionic polymerization of a monomer. In general, a suitable siloxane monomer may be reacted in the presence of an anionic initiator such as an alkyl lithium compound. In the figure below, the siloxane monomer is hexamethylcyclotrisiloxane (D3), though other monomers such as octamethylcyclotetrasiloxane (D4) may also be used. Derivatives of PDMS may be used to provide sites on the polymer to bond to the primer compound. For example, pentamethylcyclotrisiloxane may be included with the monomer to provide reactive sites on the polymer chain. In other cases, the PDMS chain may be terminated with a silyl moiety (—$SiH_3$, —$SiH_2R$, —$SiHR_1R_2$ or —$SiR_1R_2R_3$). Functionalized monomer providing for cross-linking of the polymer may also optionally be included.

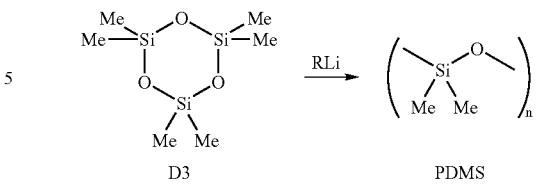

D3                    PDMS

The emulsion particles may be formed by emulsion polymerization. In this method, polymerization of the monomer occurs in micelles formed by surfactant molecules. The size of emulsion particles produced may be limited by factors including the amount and type of surfactant used, and the amount of monomer present. One skilled in the chemical arts may determine conditions to produce a desired size of the emulsion particles.

In step 320, the emulsion particles are attached to the primed nuclei. In one embodiment, the nuclei are suspended in tetrahydrofuran (THF) and heated to reflux (about 64° C.). The suspension of emulsion particles, prepared with suitable functionalization, is added. In the example in which the primer is vinyl TMS, the mixture may be maintained at the reflux temperature for about 12 hours to form a polymeric shell.

Figure 4A:
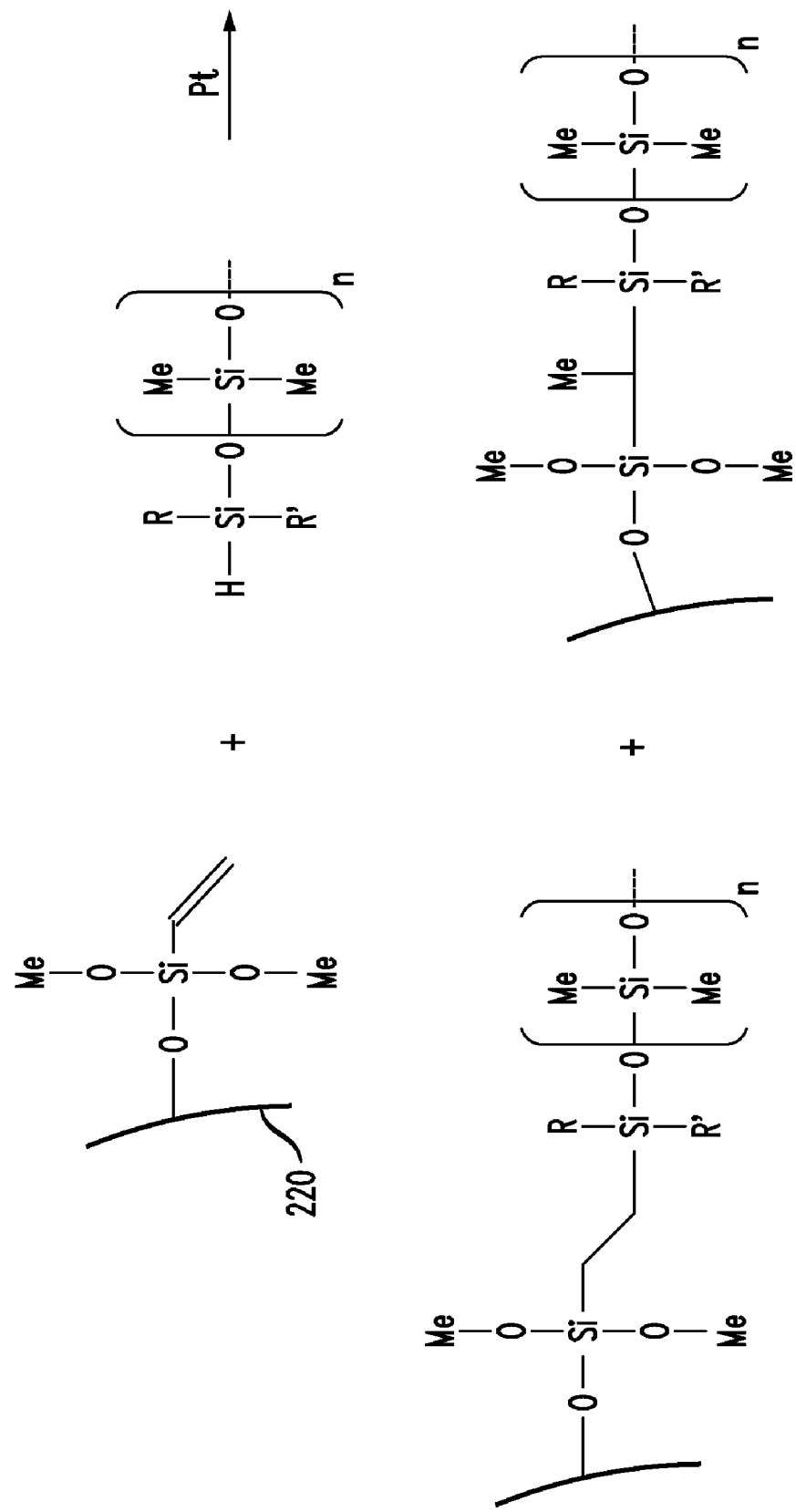
FIGS. 4A and 4B illustrate formation of poly(dimethyl siloxane), and attachment thereof to a nucleus.

It is believed that in some cases a hydrosilylation reaction forms a bond between PDMS and a nucleus primed with vinyl TMS. Turning to FIG. 4A, an example of a potential hydrosilylation reaction is illustrated. The primed nucleus, prepared as described above, is combined with silane-terminated PDMS in the presence of a Pt catalyst. Karstedt's solution of Speirs' hydrosilylation catalyst may be used as the reaction medium. The mixture may be heated to 80° C. for about 2 hours to drive the hydrosilylation reaction substantially to completion. The reaction is thought to add the silyl group across the vinyl bond of the vinyl TMS, resulting in a bond between the terminal silicon atom and a carbon atom of the vinyl moiety. In some cases, a silyl group may be added to a non-terminal chain position to provide a point of attachment to the surface. In other cases, a primer compound other than vinyl TMS having a C—C double bond may be used to bond the PDMS chain to the surface.

Turning back to the embodiment in FIG. 3 of the method 300 represented by steps 330-340, a polymerization initiator is attached to the nucleus, and a polymer is grown directly from the initiator. In the step 330, the initiator is attached to the nucleus. In some cases, the initiator is attached directly to the surface, while in other cases, another compound may serve as an intermediate.

Figure 4B:
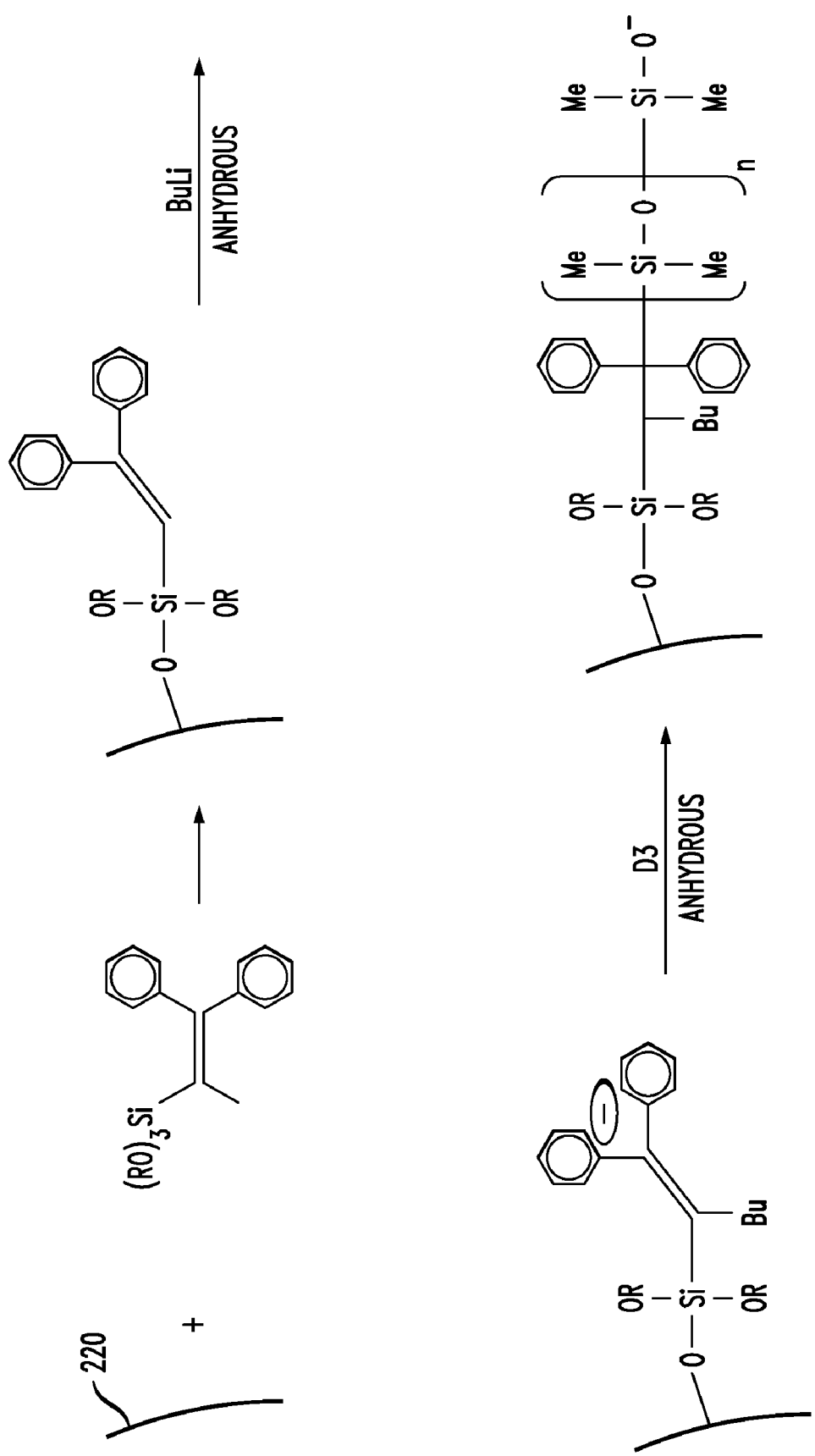

Turning briefly to FIG. 4B, illustrated is an embodiment in which an anionic initiator is bonded to a nucleus using an intermediate compound comprising a moiety that includes silicon. The intermediate compound is then reacted with an alkyl lithium compound to form the initiator. The intermediate compound illustrated is a 1,1-diphenyl, 2-(trialkoxysilyl) ethene as a non-limiting example. The presence of two phenyl rings is thought to stabilize formation of an anion of the attached intermediate compound when the alkyl lithium compound reacts therewith. However, other intermediate compounds may be used that have more, fewer or no phenyl rings. The moieties shown generally as "R" in FIG. 4B may be any group that does not sterically hinder the formation of a bond that attaches the intermediate compound to the surface 220. In some cases, R may be a short chain alkyl group, such as a methyl group.

Butyl lithium is illustrated as a non-limiting example of an alkyl lithium compound. Under anhydrous conditions, a butyl anion may react with the ethene carbon-carbon double bond. The reaction in this example forms the butyl derivative of the intermediate compound. The derivative has a stabilized negative charge that may initiate polymerization of a monomer.

Returning to FIG. 3, in the step 340, the nuclei with the attached anionic initiator are combined with a monomer. The monomer is reacted with the nuclei to produce coated nuclei. The quantity of monomer may be limited to result in a shell having a desired thickness. After the desired thickness is produced, the polymer chains may be terminated.

Turning briefly again to FIG. 4B, illustrated is the case in which the monomer is D3. The anion produced by attaching the alkyl lithium derivative to the nucleus is used to initiate polymerization of the monomer under anhydrous conditions. In some cases, a functionalized monomer may optionally be included in the monomer stock to provide cross-linking of the resulting polymer at a later stage of manufacture.

The following non-limiting example describes a method of forming the polymer on the surface of the nucleus. Nuclei are prepared with an anionic initiator primer as described previously. The nuclei are dispersed in cyclohexane in a reaction vessel from which water has been purged. A dry nitrogen atmosphere is maintained to exclude water. At room temperature, butyl lithium is added with stirring to the dispersion to convert the attached primer to the anion. The solution is permitted to stir for about 30 minutes to ensure complete reaction. D3 monomer is then added and the solution is allowed to react with agitation for about 3 hours. The coated nuclei may be precipitated from the solution by the addition of methanol.

Returning to FIG. 3, in the step 345, the coated nuclei are separated from the reaction medium. This may be done, for example, by centrifugation followed by rinsing with methanol. In a step 350, the rinsed coated nuclei are suspended in a suitable carrier solvent. The carrier solvent may be any solvent in which the polymer shell is at least partially soluble, and that is compatible with the method used to form a layer of coated nuclei on a substrate. When the polymer shell is a derivative of PDMS, THF may be a suitable carrier solvent.

Figure 5E:
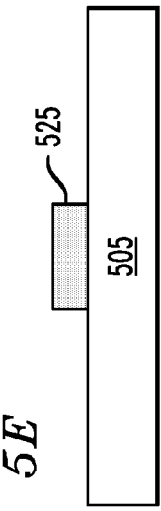
FIGS. 5A through 5H illustrate sectional views of a POW at various stages of formation.
Figure 5F:
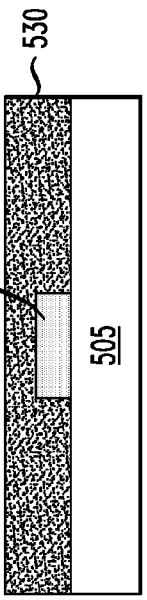
Figure 5G:
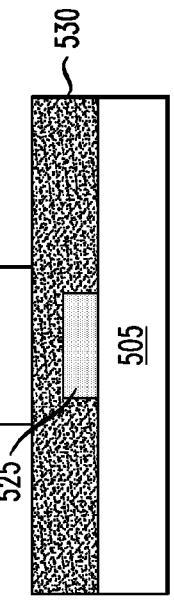
Figure 5H:
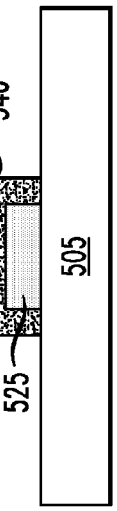
Figure 5A:
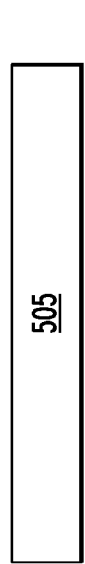
Figure 5B:
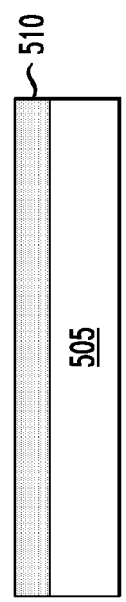

In the following description of subsequent steps in the method 300, reference is also made to FIGS. 5A-5H showing sectional views of a POW in various stages of manufacturing. In a step 360, a substrate 505, illustrated in FIG. 5A, is provided. As used herein, a substrate is provided when it is obtained from any source or formed by any currently existing or future discovered method. In FIG. 5B, a layer 510 including the coated nuclei is formed on the substrate 505. Methods of determining the specific coating conditions to result in a desired thickness and uniformity of the resulting layer are well known to those skilled in the pertinent art. The polymer may optionally be cross-linked at this point. A process utilizing short-wavelength light (ultraviolet, e.g.) or thermal activation may be used as appropriate.

Figure 5C:
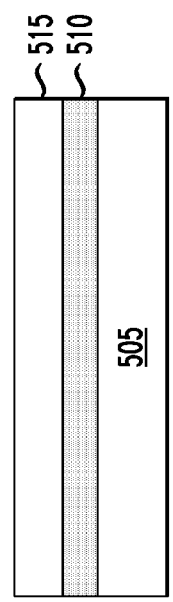
Figure 5D:
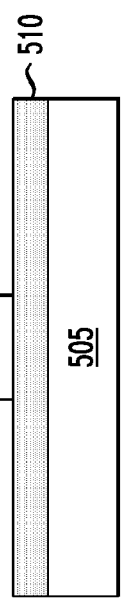

In a step 370, the layer 510 is patterned to form a POW core. In FIG. 5C, a layer of photoresist 515 is formed over the layer 510. In FIG. 5D, the photoresist is patterned to form a mask layer 520. In FIG. 5E, exposed portions of the layer 510 are removed by plasma etch, e.g., to form a POW core 525, and the mask layer 520 is removed. Methods of achieving these recited steps are known to those skilled in the pertinent arts. If additional cross-linking is desired or cross-linking was not previously performed, the polymer in the POW core 525 may optionally be cross-linked at this point.

In a step 380, a cladding layer 530, illustrated in FIG. 5F, is formed over the POW core 525. The cladding layer 530 may be a conventional material suitable for use with the POW core 525, or may be a composition formed as described herein. Restated, the cladding layer 530 may also include nuclei having a polymer chemically bonded thereto, but designed to have a lower index refraction than the POW core 525. The polymer in the cladding layer 530 may optionally be cross-linked at this point.

In a step 390, the cladding layer 530 is patterned to form a cladding 540. FIG. 5G illustrates a mask layer 535 formed by processing a photoresist layer (not shown) by conventional lithographic techniques. FIG. 5H shows a cladding 540 after selective removal of exposed portions of the cladding layer 530 by plasma etch, e.g., and removal of the mask layer 535. If not already performed, the polymer in the POW core 525 or the cladding 540 may optionally be cross-linked at this point.

Figure 6:
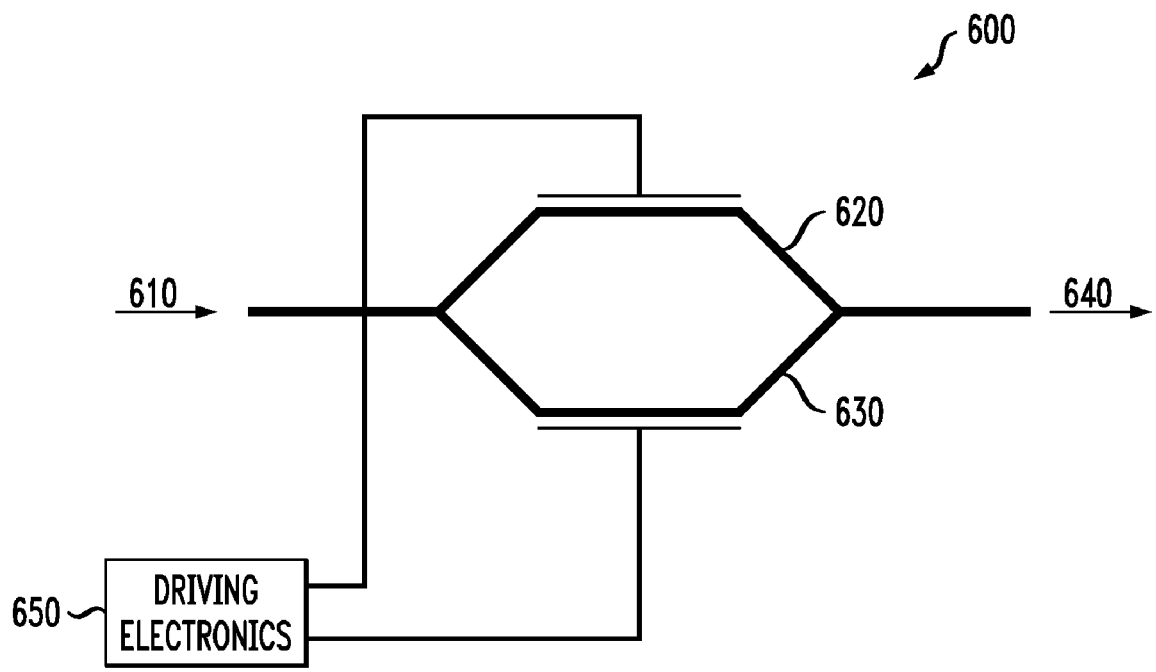
FIG. 6 illustrates an apparatus employing a POW.

Turning now to FIG. 6, illustrated is an example apparatus 600 using the POW 100 described herein. The apparatus 600 is shown as a Mach-Zehnder modulator as a non-limiting example. An input optical signal 610 is provided to the apparatus 600. The input optical signal 610 is split between waveguide arms 620, 630 and recombined to form an output optical signal 640. Driving electronics 650 provide control signals to result in a desired modulation of the optical signals passing through the waveguide arms 620, 630. Those skilled in the optical arts will appreciate that the POW 100 may be used with any optical apparatus requiring a planar optical waveguide, such as switches, filters and multiplexers.

Although the present invention has been described in detail, those skilled in the pertinent art should understand that they can make various changes, substitutions and alterations herein without departing from the spirit and scope of the invention in its broadest form.

What is claimed is:

1. An apparatus, comprising:
   a planar optical waveguide having an optical core and optical cladding next to said optical core, said optical core or cladding including a plurality of particles therein; and
   wherein each particle has a nucleus and polymeric molecules permanently bonded to said nucleus to form a polymer shell, and a plurality of nuclei are dispersed in said core or cladding, and said waveguide is configured to operate in the optical C-band.

2. The apparatus as recited in claim 1, wherein a bulk thermo-optic coefficient (TOC) of said nucleus and a bulk TOC of said shell have opposite signs.

3. The apparatus as recited in claim 2, wherein a volume fraction of said nucleus and a volume fraction of said shell in said optical core or cladding are selected to result in about equal and opposite contributions to said TOC of said waveguide by said volume fractions.

4. The apparatus as recited in claim 3, wherein a sum of a product of said volume fraction of said nucleus multiplied by said TOC of said nucleus and a product of said volume fraction of said shell multiplied by said TOC of said shell is less than about 1 E-6° $C.^{-1}$.

5. The apparatus as recited in claim 1, wherein said nucleus comprises silicon dioxide.

6. The apparatus as recited in claim 1, wherein said polymeric molecules are selected from the group consisting of:
   a derivative of poly(dimethyl siloxane);
   a derivative of poly(acrylate);
   a derivative of poly(carbonate); and
   a derivative of poly(styrene).

7. The apparatus as recited in claim 1, wherein said polymeric molecules are bonded to said nucleus by a covalent bond.

8. The apparatus as recited in claim 1, wherein said nucleus has a dimension ranging from about 100 nm to about 750 nm.

9. The apparatus as recited in claim 1, further comprising a switch, a filter or a multiplexer, wherein said switch, filter or multiplexer includes said planar optical waveguide.

10. An apparatus, comprising:
- a planar optical waveguide having an optical core and optical cladding next to said optical core, said optical core or cladding including a plurality of particles therein,
- wherein
  - each particle has a nucleus and polymeric molecules permanently bonded to said nucleus to form a polymer shell;
  - a plurality of nuclei are dispersed in said core or cladding;
  - a bulk thermo-optic coefficient (TOC) of said nucleus and a bulk TOC of said shell have opposite signs; and
  - a volume fraction of said nucleus and a volume fraction of said shell in said optical core or cladding are selected to result in about equal and opposite contributions to said TOC of said waveguide by said volume fractions.

11. An apparatus, comprising:
- a planar optical waveguide having an optical core and optical cladding next to said optical core, said optical core or cladding including a plurality of particles therein,
- wherein
  - each particle has a nucleus and polymeric molecules permanently bonded to said nucleus to form a polymer shell;
- a plurality of nuclei are dispersed in said core or cladding; and
- said polymeric molecules are bonded to said nucleus by a covalent bond.

* * * * *